(12) United States Patent
Cocosco et al.

(10) Patent No.: US 8,320,652 B2
(45) Date of Patent: Nov. 27, 2012

(54) METHOD, A SYSTEM AND A COMPUTER PROGRAM FOR SEGMENTING A STRUCTURE IN A DATASET

(75) Inventors: Christian Adrian Cocosco, Hamburg (DE); Thomas Netsch, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1260 days.

(21) Appl. No.: 11/909,165

(22) PCT Filed: Mar. 21, 2006

(86) PCT No.: PCT/IB2006/050859
§ 371 (c)(1),
(2), (4) Date: Sep. 20, 2007

(87) PCT Pub. No.: WO2006/103594
PCT Pub. Date: Oct. 5, 2006

(65) Prior Publication Data
US 2009/0010505 A1    Jan. 8, 2009

(30) Foreign Application Priority Data

Apr. 1, 2005    (EP) .................................... 05102589

(51) Int. Cl.
*G06K 9/00* (2006.01)
*G06K 9/34* (2006.01)
(52) U.S. Cl. ...................................... 382/131; 382/173
(58) Field of Classification Search .................. None
See application file for complete search history.

(56) References Cited

U.S. PATENT DOCUMENTS

| 5,273,040 A * | 12/1993 | Apicella et al. ............... 600/410 |
| 5,787,199 A | 7/1998 | Lee |
| 5,903,664 A | 5/1999 | Hartley et al. |
| 6,137,913 A | 10/2000 | Kwak et al. |

(Continued)

FOREIGN PATENT DOCUMENTS

EP          0541414          10/1992

(Continued)

OTHER PUBLICATIONS

Tsai, A.; Yezzi, A., Jr.; Wells, W.; Tempany, C.; Tucker, D.; Fan, A.; Grimson, W.E.; Willsky, A.; , "A shape-based approach to the segmentation of medical imagery using level sets," Medical Imaging, IEEE Transactions on , vol. 22, No. 2, pp. 137-154, Feb. 2003.*

(Continued)

*Primary Examiner* — Bhavesh Mehta
*Assistant Examiner* — Nirav G Patel

(57) ABSTRACT

A suitable database, including a temporal series of images is acquired (3) and subjected to a suitable binary segmentation (4) to create temporally sequenced binary coded images large portions corresponding to blood are labeled as unity, the rest is set to zero. A preceding binary coded image (8*a*) corresponding to a phase (t) from the temporal sequence is subtracted from a subsequent binary coded image (8*b*) corresponding to a phase (t+1) yielding a multi-dimensional temporal feature map (8*c*). A pre-defined deformable shape model is deformed (14) to fit the temporal feature map. The segmentation results are displayed (18) using suitable display (47). The segmented surface is overlaid on the original data using a two-, three- or four-dimensional visualization technique and can be presented as a color-code in a suitable transparency mode.

15 Claims, 5 Drawing Sheets

U.S. PATENT DOCUMENTS

Figure 1:
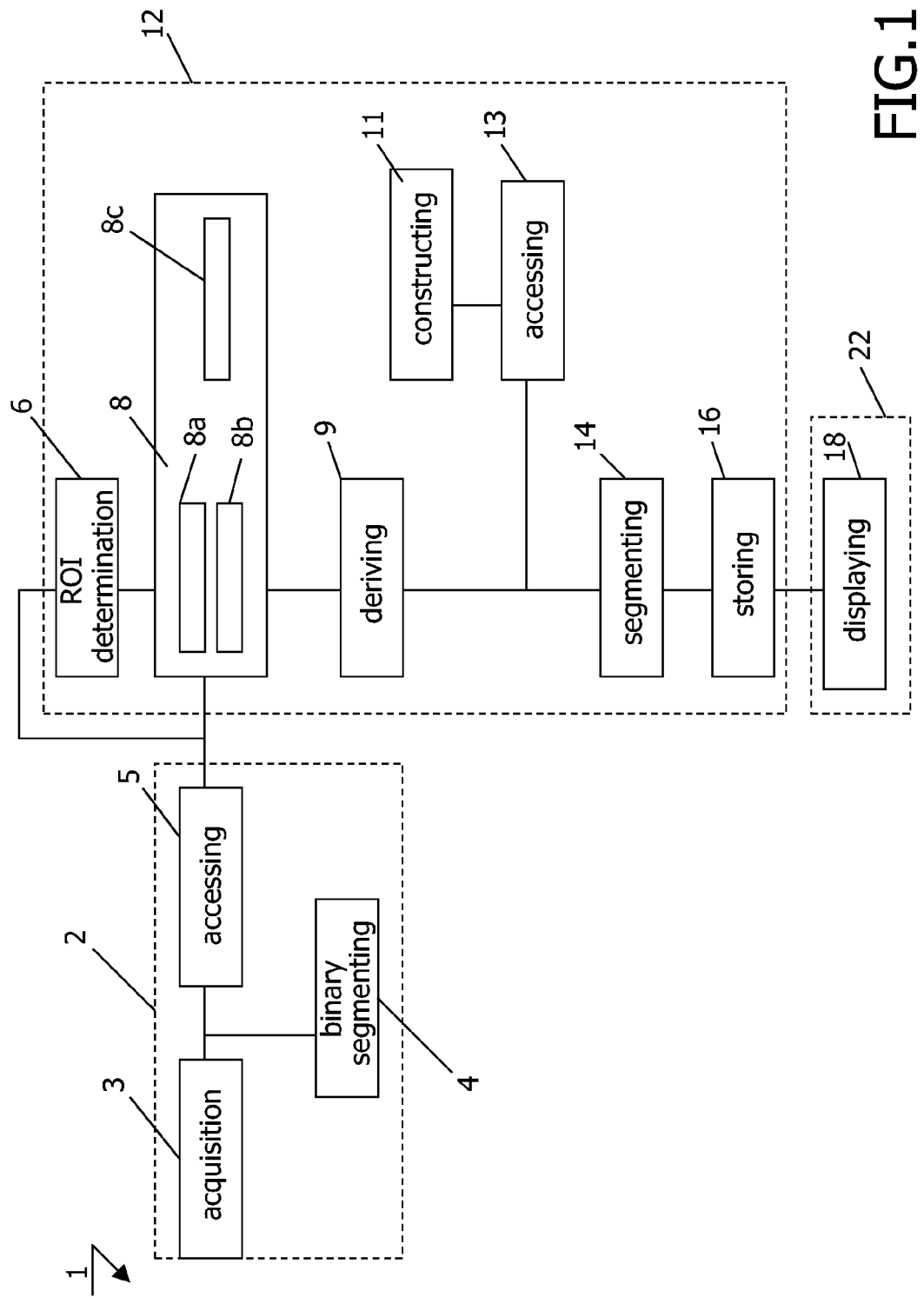

| | | | |
|---|---|---|---|
| 6,141,460 A * | 10/2000 | Amer et al. | 382/257 |
| 2003/0035583 A1 | 2/2003 | Pelagotti et al. | |
| 2003/0068074 A1 * | 4/2003 | Hahn | 382/128 |

FOREIGN PATENT DOCUMENTS

| | | |
|---|---|---|
| EP | 0747004 A2 | 12/1996 |
| EP | 0542414 B1 | 11/1997 |

OTHER PUBLICATIONS

Cocosco, C. A., et al.; Automatic cardiac region-of-interest computation in cine 3D structural MRI; 2004; International Congress Series; 1268:1126-1131.

Goshtasby, A., et al.; Segmentation of cardiac cine MR images for extraction of right and left ventricular chambers; IEEE Trans. on Medical Imaging; 14(1)56-64.

Ohyama, W., et al.; Automatic left ventricular endocardium detection in echocardiograms based on ternary thresholding method; 2000; IEEE Trans. of 15th Intl. Conf. on Pattern Recognition; 4:320-323.

Gupta, A., et al.; Segmentation and tracking of cine cardiac MR and CT images using a 3-D deformable model; 1994; IEEE Trans. on Computers in Cardiology; pp. 661-664.

Tsai, T., et al.; A novel foreground/background decision using in unsupervised segmentation of moving objects in video sequence; 2004; IEEE Trans. on Midwest Symposium on Circuits and Systems; 3:1587-1590.

Kaus, M. R., et al.; Automated segmentation of the left ventricle in cardiac MRI; 2004; Medical Image Analysis; 8:245-254.

Otsu, N.; A threshold selection method from gray-level histograms; 1979; IEEE Trans. on Systems, Man and Cybernetics; SMC-9(1).

* cited by examiner

METHOD, A SYSTEM AND A COMPUTER PROGRAM FOR SEGMENTING A STRUCTURE IN A DATASET

The invention relates to a method of segmenting a structure in a dataset comprising a plurality of multi-dimensional images acquired for respective temporal phases in a temporal sequence, each multi-dimensional image comprising data on a target tissue and on a further tissue.

The invention further relates to a system for segmenting a structure in a dataset comprising a plurality of multi-dimensional images acquired for respective temporal phases in a temporal sequence, each multi-dimensional image comprising data on a target tissue and on a further tissue.

The invention still further relates to a computer program for segmenting a structure in a dataset comprising a plurality of multi-dimensional images acquired for respective temporal phases in a temporal sequence, each multi-dimensional image comprising data on a target tissue and on a further tissue.

An embodiment of the method as is set forth in the opening paragraph is known from U.S. Pat. No. 5,273,040. The known method is arranged particularly to determine a ventricular volume in a heart. For this purpose a first image and a second image of a patient's heart region are taken at small time displaced intervals. The first and second images are subtracted from each other to generate a difference image which is indicative of the location of the tissue, notably the target tissue, like ventricular tissue, which has moved during said intervals. The difference image is thus indicative of the ventricular boundary. This difference image, plus a user controlled threshold, is used for a region of interest computation, followed by an automated classification of the image voxels into ventricle or non-ventricle. Contiguous segmented voxels are counted and adjusted for voxel size to create an indication of respective ventricular volumes.

It is a disadvantage of the known method that it presents an essentially low-level pixel based segmentation technique, a quality of which is strongly dependent on an original image quality. Also, the threshold in the known method needs to be adjusted according to the image contrast.

It is an object of the invention to provide an image segmentation method, which is robust even for images with poor quality.

For this purpose the method according to the invention comprises the steps of:
- accessing results of a binary segmentation of the temporally sequenced images yielding temporally sequenced binary coded images whereby image portions corresponding to the target tissue and to the further tissue are binary coded;
- for all temporal phases from the temporal sequence computing successive difference between pairs of successive binary coded images yielding a multi-dimensional temporal feature map comprising a plurality of discrete values;
- deriving spatial positions in the dataset corresponding to a pre-determined discrete value selectable from said plurality of discrete values;
- accessing a pre-defined deformable shape model of the structure; segmenting the structure by deforming said shape model in accordance with said spatial positions.

The technical measure of the invention is based on the insight that:
- there is a gray-level image contrast between the target tissue and the further tissue, notably between a blood pool and the rest of the image for cardiac imaging;
- there is a movement of the target tissue for different temporal phases of the temporal sequence;
- the quality of the image segmentation is substantially improved when an a-priori constructed shape model of the thought structure is employed.

It is noted that these assumptions are proven to be valid not only for cardiac imaging, but also for general thorax imaging, whereby the movement results from the respiratory cycle. It is further noted that while the known method of U.S. Pat. No. 5,273,040 discloses a subtraction between two images delayed in time, the subtraction is performed between original gray-level coded images and for the purpose of roughly segmenting a band of cardiac movement. Instead of this, according to the method of the invention, the original images are first subjected to a rough segmentation by means of performing a binary segmentation. The binary segmentation may be carried out manually or be automatically implemented.

Furtheron, the subtraction step in the method according to the invention is performed for the purpose of producing edge features for deforming a suitable deformable shape model. An example of a deformable shape model is given in M. Kaus, et al "Automated segmentation of the left ventricle in cardiac MRI", Medical Image Analysis, 8 (2004) p. 245-254. It is a particular advantage of the method according to the invention that with respect to segmentation algorithms based on shape models and appearance models, the method according to the invention eliminates a necessity of constructing an appearance model, thus simplifying the computational method. The deformable shape model per definition does not comprise any gray-level information and is therefore transferable across imaging modalities. Due to the fact that for a given sought structure the deformable model has to be constructed only once, the method of the invention is highly versatile and computationally robust.

Upon an event the multi-dimensional temporal feature map is computed, according to the method of the invention, the a-priori constructed deformable shape model is deformed in accordance with a spatial distribution of the non-zero values of the feature map. This technical measure is based on the insight that non-zero voxels of the feature map correspond to ventricular boundaries, while zero voxels correspond to the further tissue (or non-boundary areas of the ventricles) which is substantially static for different temporal phases. Moreover, the sign of the non-zero voxels of the feature map is informative, in case an image corresponding to a temporal phase t is subtracted from the image for temporal phase t+1, the endocardium boundary will correspond to −1 voxels during systole and to +1 voxels during diastole. Using this information, the robust and accurate image segmentation method is enabled.

In an embodiment of the method according to the invention, the method further comprises a preparatory step of determining a region of interest in the dataset conceived to confine a data domain of the dataset.

It is found to be preferable to implement the method of the invention within the data domain corresponding to the region of interest within the dataset, thus discarding information beyond the region of interest. The automatic determination of the region of interest can be performed in accordance with any suitable per se known technique, for example known from C. Cocosco, et al: "Automatic Cardiac Region-of-Interest Computation in Cine 3D Structural MRI", Proceedings CARS, 2004.

In a further embodiment of the method according to the invention the segmented structure is displayed on a display means.

It is found to be particularly advantageous to provide a feed-back to the operator by displaying the resulting segmentation on a suitable display means. Preferably, the segmented structure is overlaid on the original image data, which may be presented in two, three or four dimensions comprising temporal information. Still preferably, the presented segmented structure is highlighted, notably using a suitable color code.

In a still further embodiment of the method according to the invention the method further comprises a still further preparatory step of performing an automatic binary segmentation of the temporally sequenced images.

Preferably, the automatic segmentation is enabled by first a distinguishing between the target tissue, notably blood, and the further tissue by means of, for example, computing an intensity histogram for the entire multi-dimensional data domain, comprising spatial and temporal dimensions, and then by applying a suitable binary thresholding method. It is further noted that for purpose of automatic binary segmentation any per se known technique can be employed. An example of suitable automatic binary segmentation technique is given in N. Otsu "A threshold selection method from gray-level histograms', IEEE Transactions on Systems, Man, And Cybernetics, Vol. SMC-9, No. 1, January 1979.

A system according to the invention comprises:
an input for:
  accessing the results of a binary segmentation of the temporary sequenced images yielding temporally sequenced binary coded images;
  accessing a pre-defined deformable shape model of the structure;
computing means for:
  computing successive difference between pairs of successive binary coded images for all temporal phases from the temporary sequence yielding a multi-dimensional temporal feature map comprising a plurality of discrete values;
  deriving spatial positions in the dataset corresponding to a pre-determined discrete value selectable from said plurality of discrete values;
  segmenting the structure by deforming said shape model in accordance with said spatial positions.

Preferably, the system according to the invention further comprises a display means for displaying the segmented structure. Still further the system according to the invention comprises a data acquisition unit for acquiring the multi-dimensional dataset. Examples of suitable data acquisition units comprise a magnetic resonance imaging unit, a computer tomography unit, an ultra-sound unit, an X-ray unit and any combinations thereof.

A computer program according to the invention comprises instructions for causing the processor to carry out the following steps:
  accessing results of a binary segmentation of the temporality sequenced images yielding temporally sequenced binary coded images;
  for all temporal phases from the temporally sequence computing successive difference between pairs of successive binary coded images yielding a multi-dimensional temporal feature map comprising a plurality of discrete values;
  deriving spatial positions in the dataset corresponding to a pre-determined discrete value selectable from said plurality of discrete values;
  accessing a pre-defined deformable shape model of the structure;
  segmenting the structure by deforming said shape model in accordance with said spatial positions.

Preferably, the computer program according to the invention further comprises an instruction for causing the processor to carry out the step of determining a region of interest in the dataset conceived to confine a data domain of the dataset. Still preferably, the computer program according to the invention still further comprises an instruction for causing the processor to carry out the further preparatory step of performing an automatic binary segmentation of the temporally sequenced images.

These and other aspects of the invention will be explained in further detail with reference to figures.

FIG. 1 presents a schematic view of an embodiment of the method according to the invention.

Figure 2:
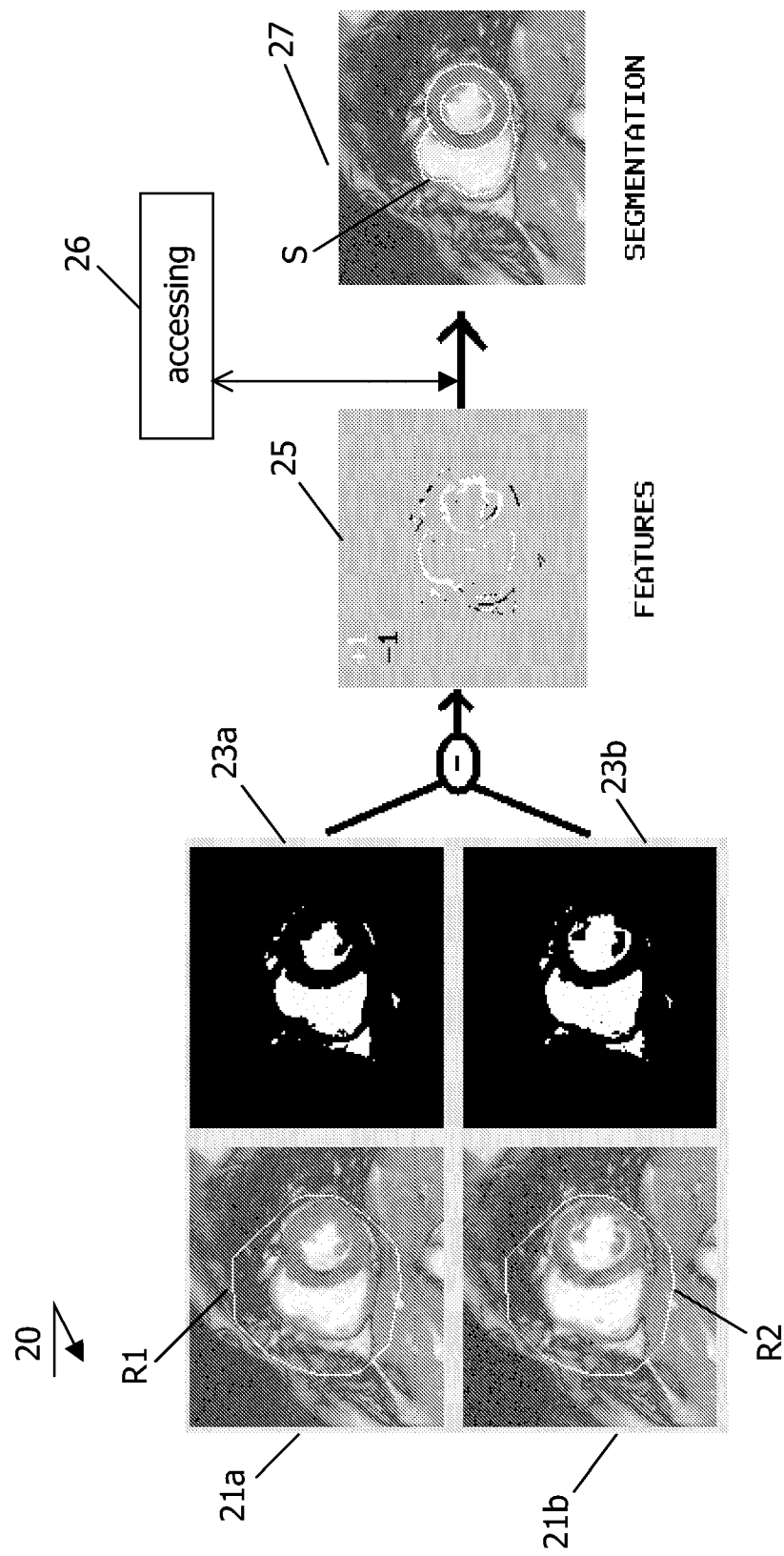

FIG. 2 presents a schematic way of selected method steps with reference to images.

Figure 3:
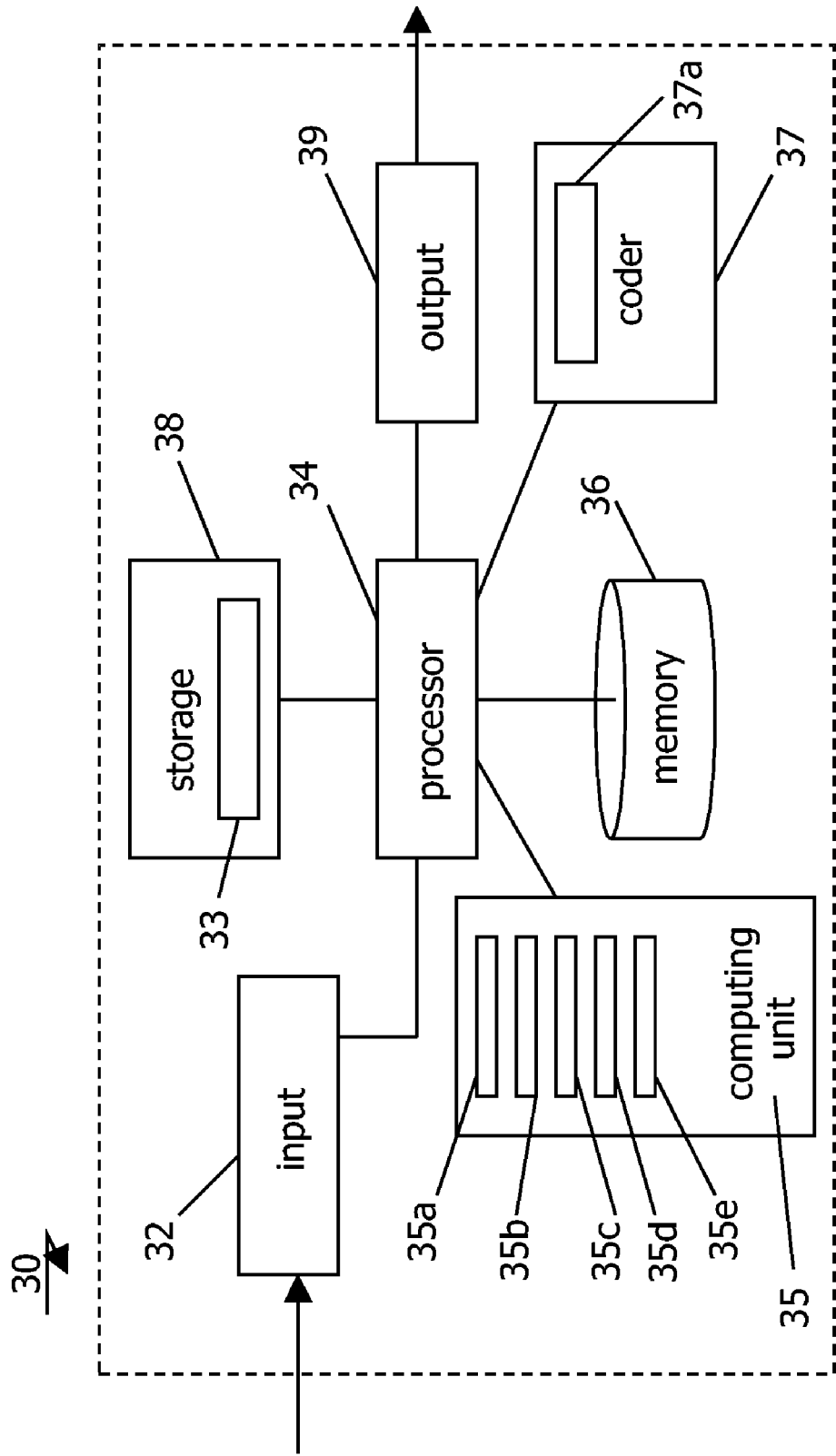

FIG. 3 presents a schematic view of an embodiment of the system according to the invention.

Figure 4:
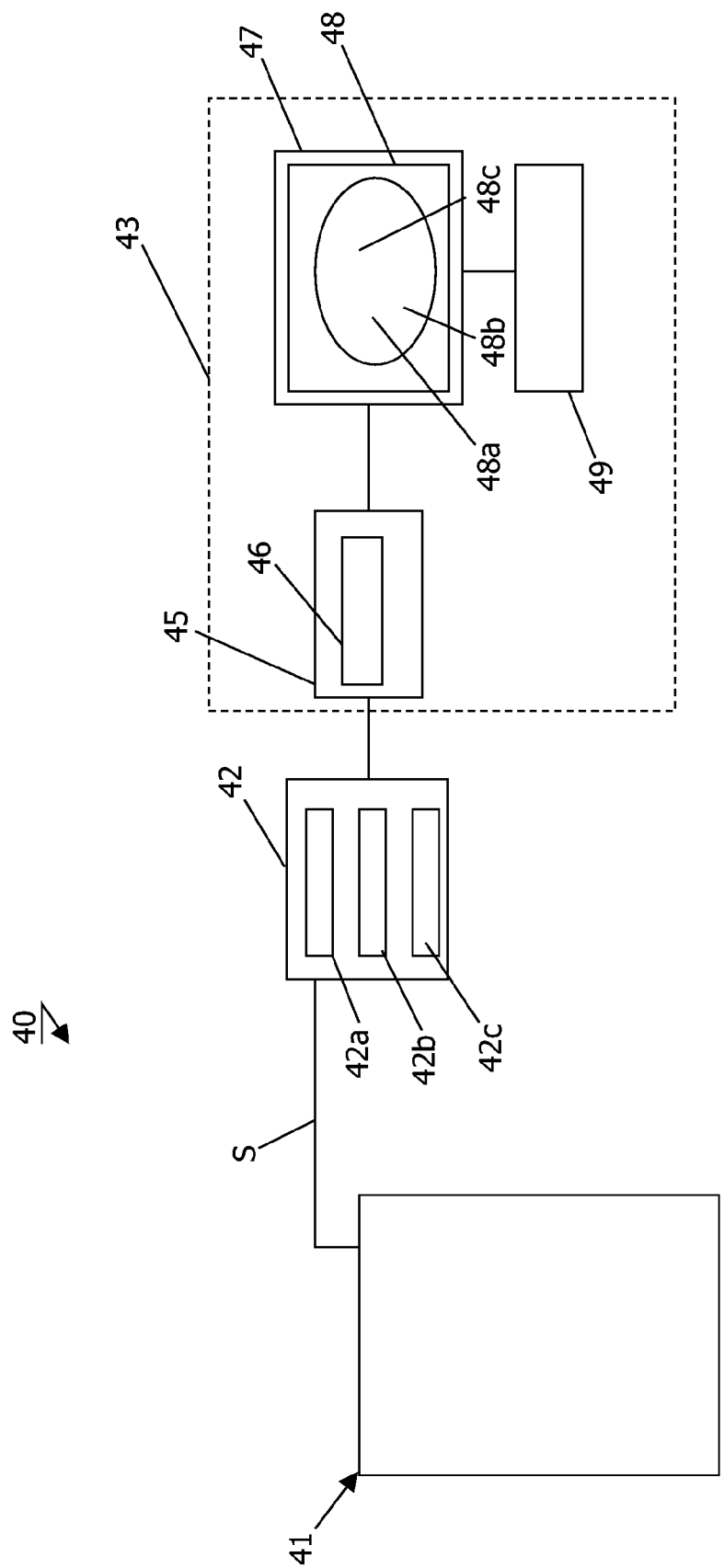

FIG. 4 presents a schematic view of a further embodiment of the system according to the invention.

Figure 5:
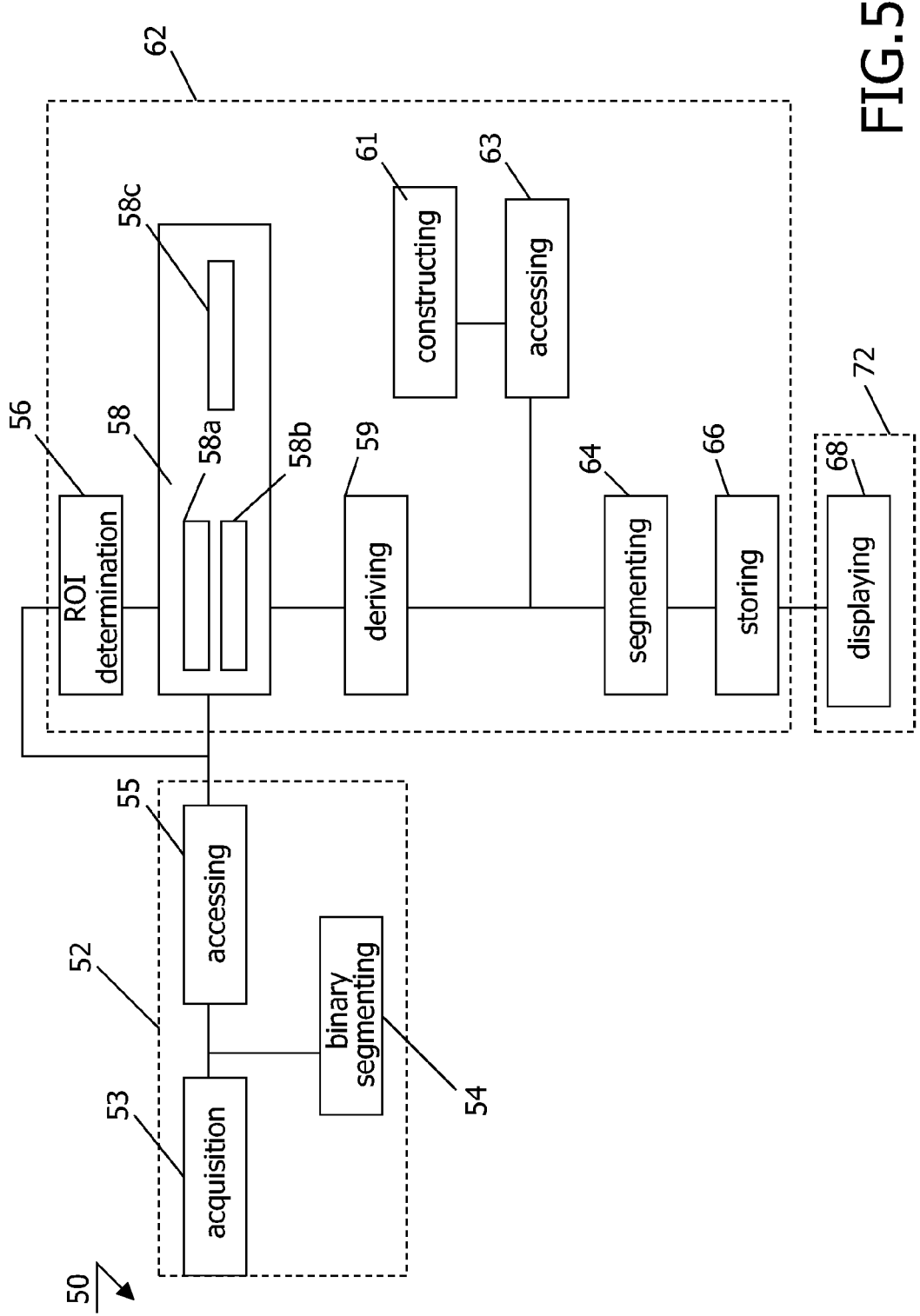

FIG. 5 presents a schematic view of a flow-chart of an embodiment of the computer program according to the invention.

FIG. 1 presents a schematic view of an embodiment of the method according to the invention. The method according to the invention will be explained using an example from cardiac imaging. The method 1 may be schematically divided into three major phases. Phase 2 comprises preparatory steps, namely the step 3 of acquiring a suitable dataset, notably a dataset comprising temporally sequenced cardiac images acquired using a magnetic resonance imaging unit by means of, for example, a balanced Fast Field Echo (bFFE) technique. The acquired dataset (not shown) is then subjected to a suitable binary segmentation at step 4 results of which are being accessed at step 5. The results comprise temporally sequenced binary coded images, whereby image portions corresponding to blood are labeled as unity, the rest is set to zero.

The subsequent phase 12 of the method according to the invention is directed to performing the image processing for segmenting a structure, notably a ventricle from the image data. Therefore, at step 8 a computation is performed whereby a preceding binary coded image 8a corresponding to a phase t from the temporal sequence is subtracted from a subsequent binary coded image 8b corresponding to a phase t+1. It is noted that any subsequent image is suitable for this purpose, not necessarily a directly following image t+1. This operation is repeated for each phase t' from the acquired temporal sequence. The result comprises a multi-dimensional temporal feature map 8c, whereby non-zero voxels correspond to ventricular boundaries. At step 9 spatial positions corresponding to a certain voxel value, (+1 or −1) are derived and will be used to segment the ventricle. For this purpose, a pre-defined deformable shape model is accessed at step 11, which is then deformed at step 14 in accordance with spatial positions, which were derived at step 9. Preferably, the segmentation result is stored at step 16. Finally, during a further phase 22 of the method according to the invention, the segmentation results are displayed at step 18 using suitable display means. Preferably, the segmented surface is overlaid on the original data using a two-, three- or four-dimensional visualization technique. Still preferable, to ease comprehension of the result, the segmented surface is presented as a color-code in a suitable transparency mode.

FIG. 2 presents a schematic way of selected method steps with reference to images. The method 20 may start at accessing original multi-dimensional images 21a, 21b, wherein, preferably, respective regions of interest R1, R2 are delineated. At steps 23a, 23b an automatic binary segmentation of the temporally sequenced images is performed (here for the simplicity reasons only two images are shown). The result comprises temporally sequenced binary coded images whereby image portions corresponding to the target tissue and to the further tissue are binary coded. Next, the results of said binary segmentation are accessed and a difference between a preceding binary coded image and a following binary coded image yielding a multi-dimensional temporal feature map comprising a plurality of discrete values is computed. It is noted that it is possible that for computing said difference a directly following image from the temporal sequence is selected. Alternatively, any subsequent image from the temporally spaced sequence may be selected for computed said difference. The resulting image after the difference is computed is given by 25. The image 25 comprises image elements having discrete values, namely −1, 0, +1. The method according to the invention uses the insight that the sign of non-zero image elements is informative. Namely, the endocardium boundary will be −1 during the systole phase, whereas it will be +1 during diastole. In accordance with the method of the invention, spatial positions in the dataset corresponding to a pre-determined discrete values (+1, −1) selectable from said plurality of discrete values (−1, 0, +1) are computed. At step 26 of the method according to the invention, a pre-defined deformable shape model of the structure is accessed. It is noted that the pre-defined deformable model may comprise a statistical shape model, or it may comprise a simple geometrical/topological deformable model. After the deformable shape model is accessed the sought structure is segmented at step 27 by deforming said shape model in accordance with said spatial coordinates yielding sought structure S.

FIG. 3 presents a schematic view of an embodiment of the system according to the invention. The system 30 comprises an input 32 for accessing results of a binary segmentation of the temporally sequenced images thus providing temporally sequenced binary coded images, whereby image portions corresponding to a target tissue, notably blood, and to a further tissue, notably the rest, are coded. It is noted that said binary segmentation may have been derived manually or automatically. Preferably, pixels or voxels corresponding to the target tissue are set to unity, whereby the other pixels or voxels are set to zero. The dataset may be accessed from a suitable storage unit (not shown), which may be situated locally or remotely. Alternatively and/or additionally the input 32 can be arranged to receive data from a suitable data acquisition unit (not shown) providing the dataset in a suitable computer-readable format. Additionally, the input 32 is arranged to access a pre-defined shape model of the sought structure. Preferably, a deformable shape model is used. The results of the binary segmentation step are then made available by the input 32 to a computing unit 35 of the system 30, which is arranged to carry out the image segmentation in accordance with the invention yielding sought anatomic structure, notably a cardiac ventricle. These steps are implemented using per se known respective computing algorithms, which are explained in the foregoing.

The core of the system 30 is formed by a processor 34 which is arranged to operate the components of the apparatus 30, it being the input 32, the computing unit 35, the working memory 36, and the background storage unit 38. An example of a suitable processor 34 is a conventional microprocessor or signal processor, the background storage 38 (typically based on a hard disk) and working memory 36 (typically based on RAM). The background storage 38 can be used for storing suitable datasets (or parts of it) when not being processed, and for storing results of the binary image segmentation step, the step of computing a difference between respective pairs of the binary coded images, etc. The working memory 36 typically holds the (parts of) dataset being processed and the results of the segmentation of the structure. The computing unit 35 preferably comprises a suitable number of executable subroutines 35a, 35b, 35c, 35d, 35e. The subroutine 35a is arranged to perform a binary image segmentation of the images, notably of cardiac images to distinguish between the target matter, notably blood, and the other matter, notably myocardium yielding binary coded images. The subroutine 35b is arranged to compute successive difference between pairs of successive binary coded images yielding a multi-dimensional temporal feature map comprising a plurality of discrete values. The subroutine 35c is arranged to derive spatial positions in the dataset corresponding to a pre-determined discrete value selectable from said plurality of discrete values. Preferably, it is pre-determined that a certain value carries certain information on the structure. For example, in case when a binary coded image for phase t is subtracted from a binary coded image for phase t+1, it is pre-determined that pixels or voxels with a value +1 correspond to an endocardium boundary during the diastole, while pixels or voxels with a value −1 correspond to the endocardium boundary at systole. The subroutine 35d is arranged to access the deformable shape model or, alternatively, it may be arranged to build the deformable shape model based on a suitable plurality of shape parameters. The subroutine 35e is arranged to segment the structure by deforming the shape model 35d in accordance with spatial coordinates determined at step 35c.

The system 30 according to the invention further comprises an overlay coder 37 arranged to produce a rendering of a suitable overlay of the original data with the results of the segmentation step. Preferably, the computed overlay is stored in a file 37a. Preferably, overlay coder 37, the computing unit 35 and the processor 34 are operable by a computer program 33, preferably stored in memory 38. An output 39 is used for outputting the results of the processing, like overlaid mage data representing the anatomy of the heart overlaid with the suitable rendering of the segmented structure.

FIG. 4 presents a schematic view of a further embodiment of the system according to the invention. The system 40 is arranged for segmenting a structure, notably a ventricle, in a multi-dimensional dataset comprising a plurality of temporally spaced cardiac images. Preferably, the system 40 comprises a data acquisition unit 41, notably a magnetic resonance imager, a tomography unit, an ultra-sound apparatus, or an X-ray unit for acquiring the dataset. Usually the data is conceived to be transferred from the data acquisition unit 41 to the processor 42 by means of a suitably coded signal S. The processor performs suitable data segmentation, as is explained with reference to FIG. 2, whereby at its output a variety of possible data can be produced. For example, it is possible that data 42a comprises segmentation of the left ventricle, the data 42b provides segmentation of the right ventricle and data 42c provides segmentation of the epicardium, which is deduced from the data 42a and 42b.

Either of the data 42a, 42b, 42c or a suitable combination thereof is made available to a further input 45 of a suitable viewer 43. Preferably, the further input 45 comprises a suitable further processor arranged to operate a suitable interface using a program 46 adapted to control a user interface 48 so that an image of the anatomic data is suitably overlaid with the results of the segmentation step, notably with data 42a, 42b and/or 42c, thus yielding image portions 48a, 48b, 48c. Preferably, for user's convenience, the viewer 43 is provided with a high-resolution display means 47, the user interface being operable by means of a suitable interactive means 49, for example a mouse, a keyboard or any other suitable user's input device.

FIG. 5 presents a schematic view of a flow-chart of an embodiment of the computer program according to the invention. The computer program 50 may be schematically divided into three major phases. Phase 52 comprises preparatory steps, namely the step 53 of acquiring a suitable dataset, notably a dataset comprising temporally sequenced cardiac images. The acquired dataset (not shown) is then subjected to a suitable manual or automatic binary segmentation at step 54 results of which are being accessed at step 55. The results comprise temporally sequenced binary coded images, whereby image portions corresponding to blood are preferably labeled as unity, the rest being set to zero.

The subsequent phase 62 of the operation of the computer program according to the invention is directed to performing the image processing for segmenting a structure, notably a ventricle from the image data. Therefore, at step 58 a computation is performed whereby a preceding binary coded image 58a corresponding to a phase t from the temporal sequence is subtracted from a subsequent binary coded image 58b corresponding to a phase t+1. This operation is repeated for each phase t' from the acquired temporal sequence. The result comprises a multi-dimensional temporal feature map 58c, whereby non-zero voxels correspond to ventricular boundaries. At step 59 spatial positions corresponding to a certain voxel value, (+1 or −1) are derived and will be used to segment the ventricle. For this purpose, a pre-defines deformable shape model is accessed at step 61, which is then deformed at step 64 in accordance with spatial coordinates, which were derived at step 59. Preferably, the segmentation result is stored at step 66. Finally, during a further phase 72 of the method according to the invention, the segmentation results are displayed at step 68 using suitable display means. Preferably, the segmented surface is overlaid on the original data using a two- or three-dimensional visualization technique. Still preferable, to ease comprehension of the result, the segmented surface is presented as a color-code in a suitable transparency mode.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method of segmenting an endocardium boundary in a dataset comprising a plurality of multi-dimensional images acquired for respective temporal phases in a temporal sequence, each multi-dimensional image comprising data on a target tissue and on a further tissue, said method comprising the steps of:
   accessing results of a binary segmentation of the temporally sequenced images yielding temporally sequenced binary coded images whereby image portions corresponding to blood are labeled with a first preselected fixed value and all other image portions are labeled with a second predetermined fixed value different from the first preselected fixed value;
   for all temporal phases from the temporal sequence computing successive difference between pairs of successive binary coded images yielding a multi-dimensional temporal feature map comprising a plurality of discrete positive, negative, and zero values such that the spatial positions have a value which is either positive or negative during systole and have a value which is the other of either positive or negative during diastole;
   deriving spatial positions of segmentation edge segments in the dataset corresponding to a pre-determined discrete value selectable from said plurality of discrete positive, negative, and zero values;
   accessing a pre-defined deformable topographical model of the endocardium boundary;
   segmenting the structure by deforming said deformable topographical model to fit said spatial positions of the edge segments.

2. The method according to claim 1, wherein one of the first and second predetermined fixed values is zero.

3. The method according to claim 1, wherein said method further comprises the step of displaying the segmented structure on a display device.

4. The method according to claim 1, wherein the method further comprises a still further preparatory step of performing an automatic binary segmentation of the temporally sequenced images.

5. A system for segmenting an endocardium boundary in a dataset comprising a plurality of multi-dimensional images acquired for respective temporal phases in a temporal sequence, each multi-dimensional image comprising data on a target tissue and on a further tissue, said system comprising:
   an input for:
      accessing the results of a binary segmentation of the temporally sequenced images yielding temporally sequenced binary coded images;
      accessing a pre-defined deformable shape model of the structure endocardium boundary;
   a computer programmed for:
      computing successive difference between pairs of successive binary coded images for all temporal phases from the temporal sequence yielding a multi-dimensional temporal feature map comprising a plurality of discrete values, wherein the discrete values are one of −k, 0, and +k where k is a preselected value and wherein the spatial positions have a value which is either +k or −k during systole and have a value which is the other of either +k or −k during diastole;
      deriving spatial positions in the dataset corresponding to a predetermined discrete value selectable from said plurality of discrete values;
      segmenting the endocardium boundary by deforming said shape model to fit said derived spatial positions.

6. The system according to claim 5, wherein the system further comprises a display unit for displaying the segmented structure.

7. The system according to claim 5, wherein the system further comprises a data acquisition unit for acquiring the dataset.

8. An apparatus for segmenting a target anatomical structure which changes shape in a temporal series of anatomical images, the apparatus comprising:
   an input unit which receives the temporal series of anatomical images;
   one or more memory units which store at least one shape model of the target anatomical structure;
   one or more processors programmed to:
      convert each image of the series of anatomical images into a binary image wherein in the binary image voxels depicting blood are labeled as nonzero values and all other voxels are labeled as zero,
      subtract temporally adjacent binary images to generate feature maps, the voxels of the feature maps at a blood tissue interface having a value of positive or negative and the other voxels having a value of zero, retrieve the shape model from the at least one memory, deform the shape model to fit individual feature maps, to define a temporal series of segmented surface[s] of the target anatomical structure in the temporal series of anatomical images, overlay the segmented surfaces on corresponding anatomical images; and a display device which displays the temporal series of anatomical images with the overlaid segmented surfaces.

9. The apparatus according to claim 8, wherein the non-zero value is unity.

10. The apparatus according to claim 8, further including:

a diagnostic scanner connected with the input unit, the diagnostic scanner acquiring the temporal series of anatomical images.

11. The apparatus according to claim 8, wherein in the binary image voxels depicting blood are labeled as unity and all other voxels are labeled as zero.

12. The apparatus according to claim 11, wherein in the feature maps, voxels as a blood tissue interface have a value of 1 or −1 and the other voxels have a value of zero.

13. The apparatus according to claim 12, wherein deforming the shape model includes deforming the shape model to fit the voxels with the value of 1 or −1.

14. A non-transitory computer readable medium carrying software for controlling a processor to perform the method according to claim 1.

15. An apparatus for segmenting a target anatomical structure which changes shape in a temporal series of anatomical images, the apparatus comprising:

an input unit which receives the temporal series of anatomical images;

one or more memory units which store at least one shape model;

one or more processors programmed to:

convert each image of the series of anatomical images into a binary image wherein in the binary image voxels depicting blood are labeled as unity and all other voxels are labeled as zero, subtract temporally adjacent binary images to generate feature maps wherein in the feature maps, voxels as a blood tissue interface have a value of 1 or −1 and the other voxels have a value of zero, retrieve the shape model from the at least one memory, deform the shape model to fit individual feature maps, to define a segmented surface of the target anatomical structure in the anatomical images of the series of anatomical images, overlay the segmented surfaces on corresponding anatomical images wherein the anatomical images include an endocardium boundary, voxels with the value of one of +1 or −1 during systole and voxels with the value of the other of +1 or −1 during diastole, correspond to the endocardium boundary; and a display device which displays the anatomical images with the overlaid segmented surfaces.

* * * * *